(12) United States Patent
Nguyen et al.

(10) Patent No.: US 11,790,556 B2
(45) Date of Patent: Oct. 17, 2023

(54) DETERMINING OPTICAL CENTER IN AN IMAGE

(71) Applicant: Nvidia Corporation, Santa Clara, CA (US)

(72) Inventors: Hugh Phu Nguyen, Milpitas, CA (US); Paul Kalapathy, Ozark, MO (US)

(73) Assignee: Nvidia Corporation, Santa Clara, CA (US)

( * ) Notice: Subject to any disclaimer, the term of this patent is extended or adjusted under 35 U.S.C. 154(b) by 340 days.

(21) Appl. No.: 17/183,969

(22) Filed: Feb. 24, 2021

(65) Prior Publication Data

US 2022/0270291 A1 Aug. 25, 2022

(51) Int. Cl.
*G06T 7/80* (2017.01)
*H04N 25/61* (2023.01)

(52) U.S. Cl.
CPC .............. *G06T 7/80* (2017.01); *H04N 25/61* (2023.01)

(58) Field of Classification Search
CPC . G06T 7/80; G06T 5/007; G06T 2207/10004; H04N 25/61
See application file for complete search history.

(56) References Cited

U.S. PATENT DOCUMENTS

| | | | |
|---|---|---|---|
| 2008/0174704 A1* | 7/2008 | Tan ..................... | H04N 9/3185 348/E9.027 |
| 2009/0021632 A1* | 1/2009 | Huggett ................. | H04N 23/81 348/E5.079 |
| 2010/0141780 A1* | 6/2010 | Tan ..................... | H04N 9/3185 348/222.1 |

* cited by examiner

*Primary Examiner* — Molly Wilburn
(74) *Attorney, Agent, or Firm* — Hogan Lovells US LLP

(57) ABSTRACT

Optical center is determined on a column-by-column and row-by-row basis by identifying brightest pixels in respective columns and rows. The brightest pixels in each column are identified and a line is fit to those pixels. Similarly, brightest pixels in each row are identified and a second line is fit to those pixels. The intersection of the two lines is the optical center.

20 Claims, 12 Drawing Sheets

DETERMINING OPTICAL CENTER IN AN IMAGE

BACKGROUND

Various applications may generate or receive input image data to perform one or more functions. The image data may be generated by a camera or other acquisition device that includes a lens. Often, properties of the camera are calibrated prior to image acquisition. These images may experience an effect known as vignetting, where pixel intensity decreases from the center of the image toward the edges. This effect may become more pronounced based on various features of the lens. Various methods may be used to correct vignetting, such as mesh-based methods or rectangular fitting, among others. These methods are often insufficient for correcting vignetting errors due to poor determination of an image optical center.

BRIEF DESCRIPTION OF THE DRAWINGS

Various embodiments in accordance with the present disclosure will be described with reference to the drawings, in which.

DETAILED DESCRIPTION

Figure 1A:
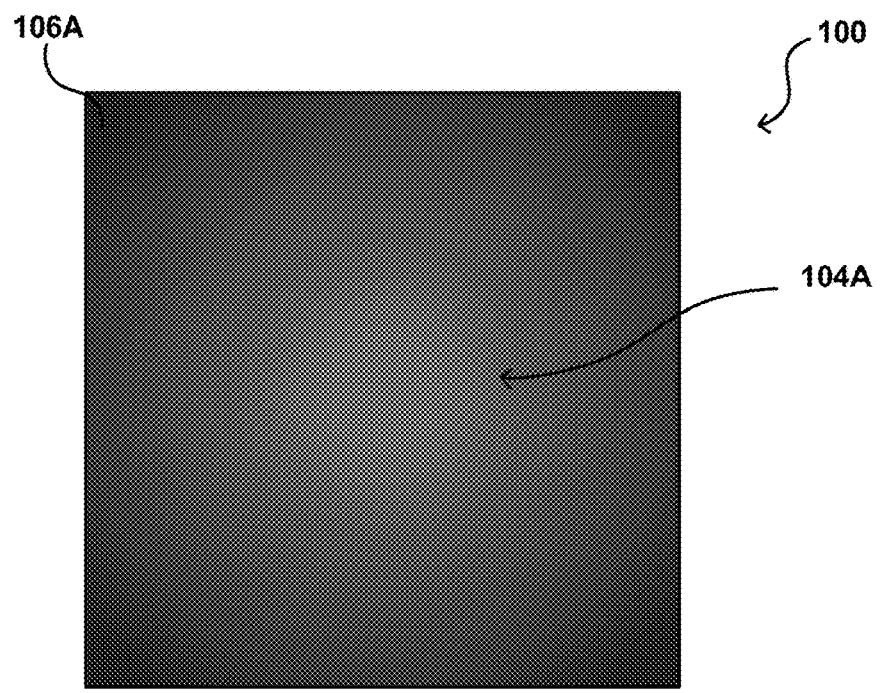
FIGS. 1A and 1B illustrate vignetting in images, according to at least one embodiment.
Figure 1B:
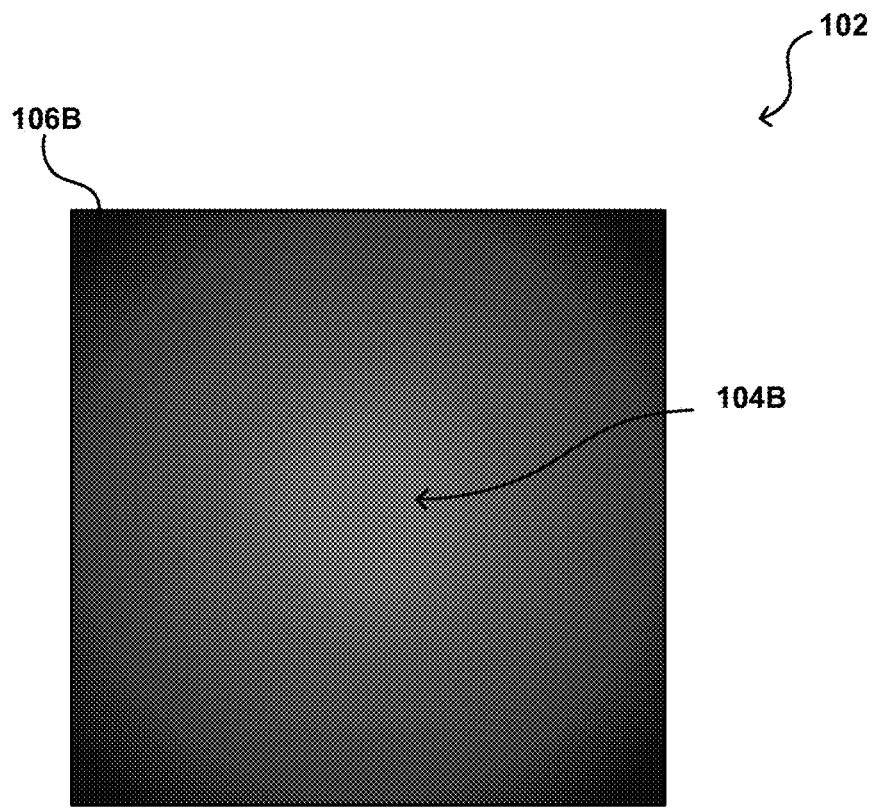

Approaches in accordance with various embodiments provide for determination of an optical center of an image, such as a flat field image. Information corresponding to the optical center may then be provided as a calibration factor. Various applications may utilize image files, such as the rendering, encoding, and/or transmission (as example and non-limiting embodiments) of pictures, video frames, etc. Vignetting is an effect where a pixel intensity gradually falls off or decreases from the center of the image toward the edges. FIGS. 1A and 1B illustrate examples of images 100, 102 experiencing vignetting where central regions 104A, 104B are brighter (e.g., have a greater pixel intensity) than edge regions 106A, 106B. In various embodiments, the images 100, 102 may be generated using one or more lenses. As an example, the image 100 may be generated using a normal length lens while the image 102 may be generated using a fisheye lens. It should be appreciated that these lenses are provided as examples and that any type of lens may be utilized by a variety of devices in order to generate the images 100, 102.

Optical vignetting may be a result of lenses used to acquire the image, where the center of the vignetting is at or substantially at the optical center of the image. While various correction algorithms may be used, these methods may either only approximate the optical center or may utilize additional information, such as a calibration image, which may also be referred to as a flat field image. The flat field image may be an image that is uniformly illuminated. For example, the illumination may be provided by a dispersed light coming from one or more directions. However, due to the illumination of this image, the area surrounding the fall-off center may be so flat that noise dominates the pixel intensity variations. As a result, identification of the image center may be challenging, and traditional methods cannot accurately identify the center.

Figure 2:
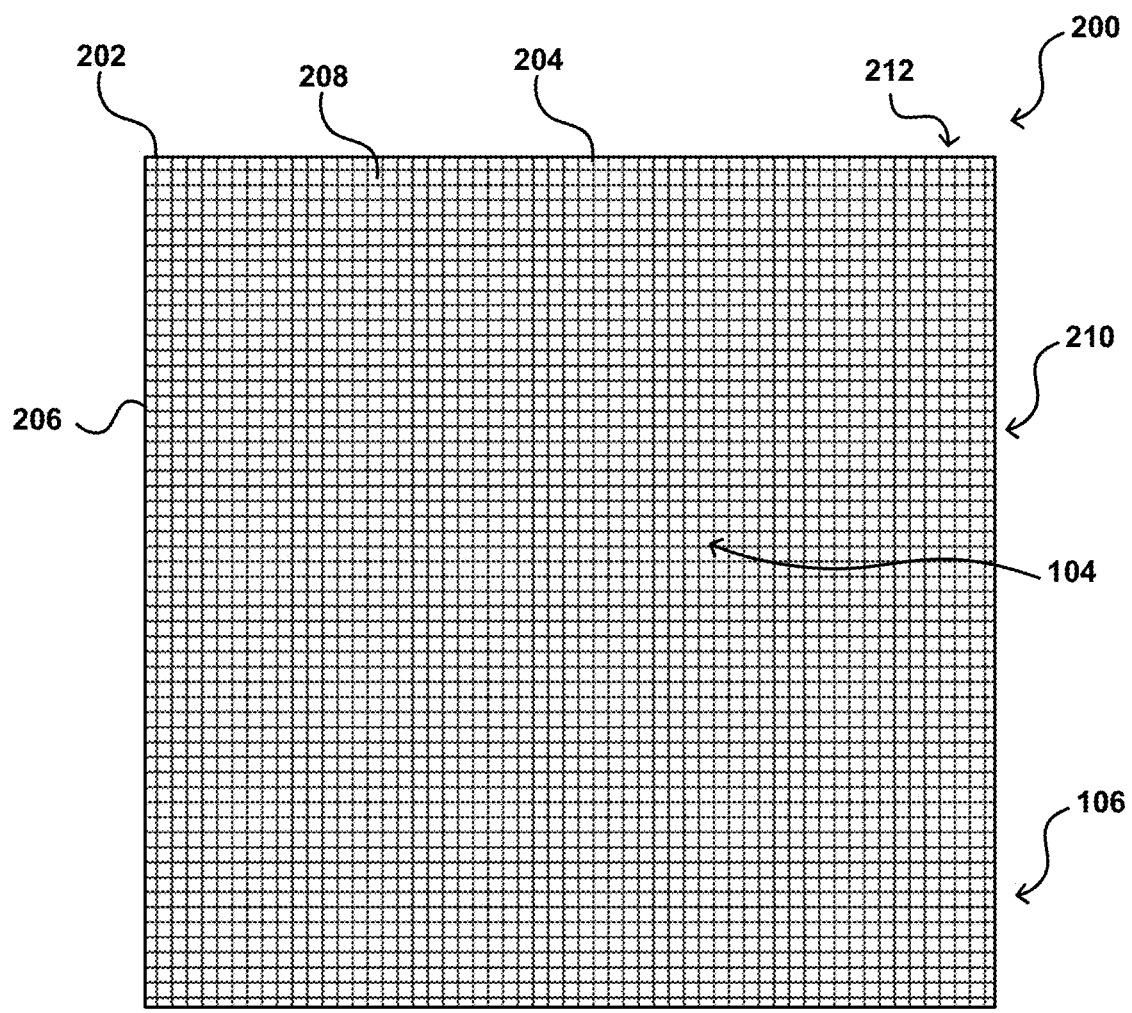
FIG. 2 illustrates a pixel layout for an image, according to at least one embodiment.

FIG. 2 illustrates an example pixel layout 200 for an image 202, where the pixel layout 200 is presented by vertical lines 204 and horizontal lines 206 that separate the image 202 into individual pixels 208. It should be appreciated that the embodiment of FIG. 2 is for illustrative purposes only and that an image may include many more pixels. Moreover, the lines 204, 206 are also provided as illustrative markers to show separation between adjacent pixels 208. In operation, each of the pixels 208 will have a value that corresponds to a brightness or intensity of the pixels 208, for which, as noted above, pixels closer to the central region 104 may be brighter than pixels closer to the edge region 106 due to the vignetting. In an embodiment, a brightest or highest intensity pixel may be identified within each row 210 and column 212 of the image 202. As will be described in detail below, identification of the brightest pixel in each row 210 and/or column 212 may include fitting a curve over data corresponding to individual pixels forming the rows or columns, and determining a maximum or peak of the curve to identify the brightest or substantially brightest pixel. It should also be appreciated that a fractional pixel or floating point value for a pixel may also be utilized as the brightest or substantially brightest pixel.

Figure 3A:
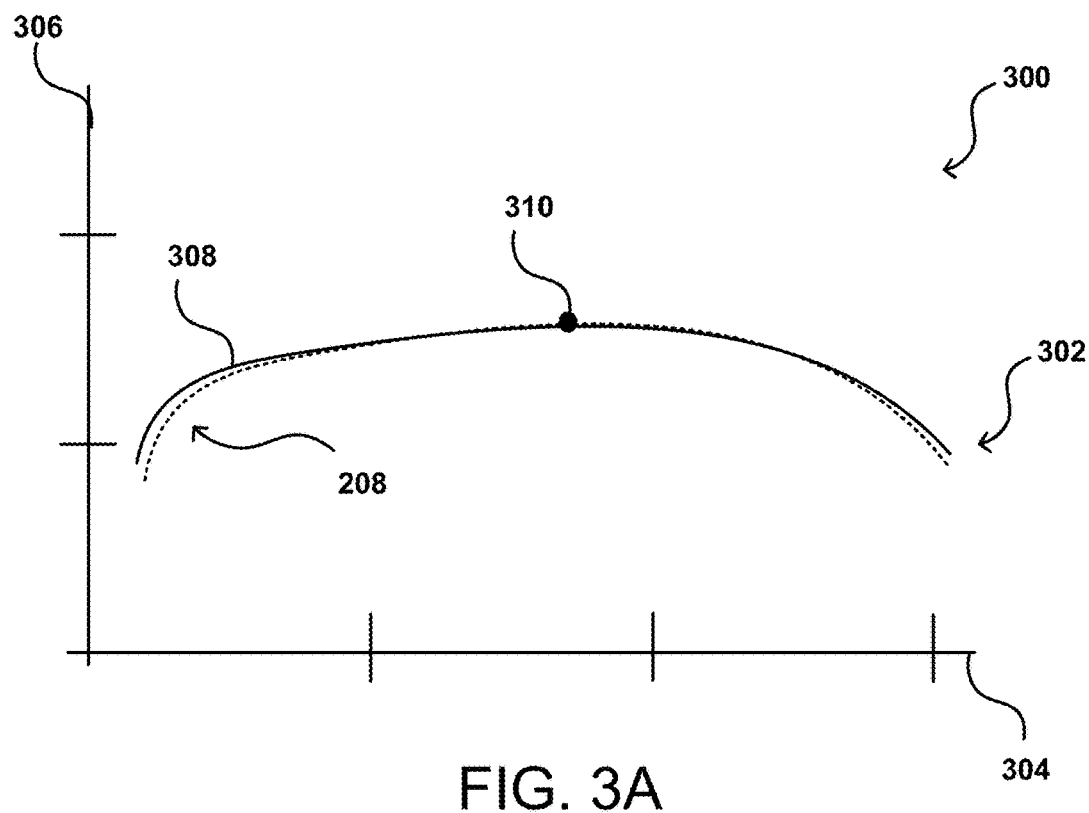
FIGS. 3A and 3B illustrate curve fitting over a range of pixel intensity values, according to at least one embodiment.

FIG. 3A illustrates a graphical representation 300 of a series 302 of pixel intensity values. In this example, an x-axis 304 represents a pixel location and a y-axis 306 represents pixel intensity. As noted above, vignetting typically leads to a gradual decrease in intensity at the edges, and as a result, the pixels 208 are arranged such that pixels 208 near the central region 104 have a greater intensity than those at the edges. In this example, a fit curve 308, which is illustrated as a 1D curve, is arranged (e.g., fit) over the pixels 208 to identify a highest intensity pixel 310. As noted, the highest intensity pixel may include an entire pixel, a fractional pixel, a float value, or the like. It should be appreciated that the highest intensity pixel 310 may correspond to a pixel with the greatest value and/or a value within a threshold amount of adjacent pixels. That is, embodiments of the present disclosure may identify pixel values that are within a threshold amount of a highest value. The highest intensity pixel 310 may be extracted from the series 302 for later use.

In at least one embodiment, the fit curve 308 is derived mathematically using a curve fitting technique. The curve may be based on a moving average, quantic polynomial, cubic polynomial, quadratic polynomial, or any other reasonable curve fitting technique. In embodiments, different curve fitting techniques may be applied and then compared to one another, for example, to determine a difference or range between the identified highest intensity pixel 310. Accordingly, in embodiments, the highest intensity pixel 310 may be determined by averaging the highest intensity pixels for different curve fitting techniques. Furthermore, it should be appreciated that different curve fitting techniques may be utilized for different columns and/or rows. That is, the same technique may not be applied to each column and/or each row of an image. Various embodiments of the present disclosure may apply this curve fitting technique to each individual column and/or each individual row to determine a series of highest intensity pixels, as will be described below. It should be appreciated that the curve fitting technique may be selected, at least in part, to account for the noise of the image, as noted above.

Figure 3B:
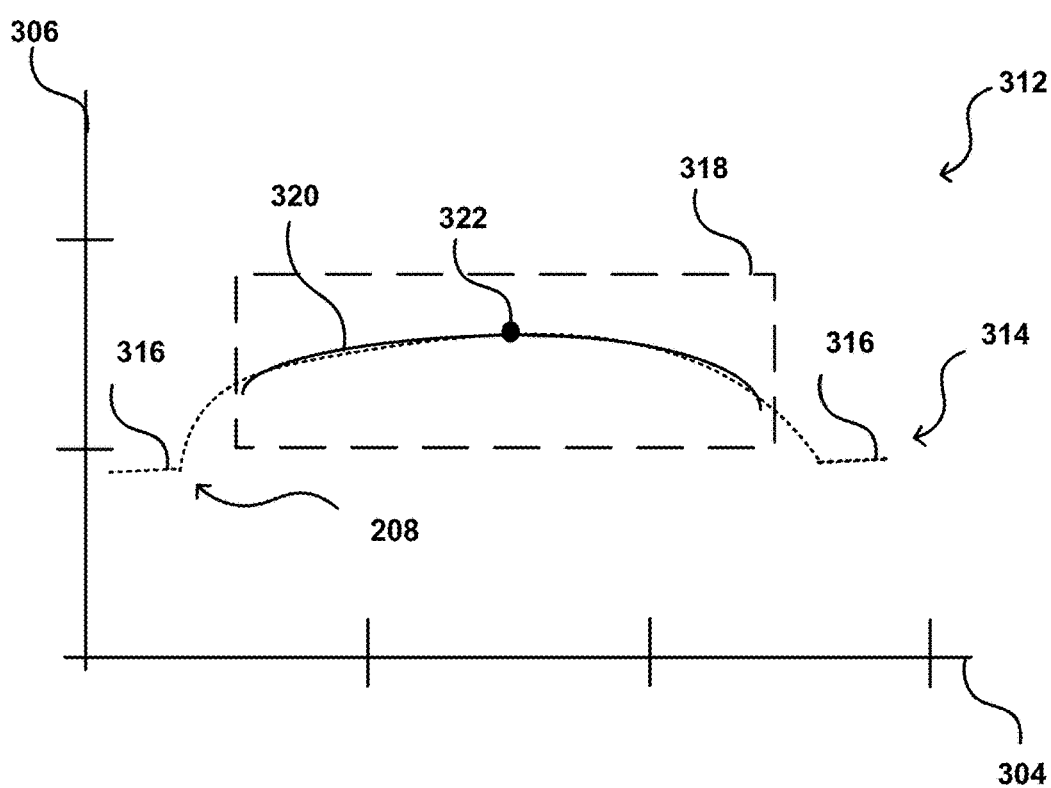

FIG. 3B illustrates a graphical representation 312 of a series 314 of pixel intensity values. In this example, the x-axis 304 represents a pixel location and the y-axis 306 represents pixel intensity. As noted above, vignetting typically leads to a gradual decrease in intensity at the edges, and as a result, the pixels 208 are arranged such that pixels 208 near the central region 104 have a greater intensity than those at the edges. This effect may be even more pronounced in cases where the image is produced by a fisheye lens, as is the case of the representation 312. For images produced with a fisheye lens, the sides may be almost entirely black (e.g., low intensity), as illustrated by the substantially flat regions 316 shown in FIG. 3B. These regions 316 illustrate low intensity pixels having substantially the same value, indicating a darkened or black edge of the image. Accordingly, in at least one embodiment, the flat regions 316 may be clipped or otherwise omitted from the curve fitting described above to determine the highest intensity pixel.

In this example, a section 318 is clipped or otherwise isolated for the curve fitting analysis. It should be appreciated that the section 318 may be determined by a variety of methods, such as a percentage of the series 314, the slope of the curve formed by the series 314, and the like. By way of example only, the section 318 may have a starting location approximately 25 percent from an edge of the image and an ending location approximately 25 percent from an opposite edge of the image. In other words, the section 318 may span between approximately 25 percent to 75 percent of the length of the series 314. Thereafter, a fit curve 320 is arranged over the pixels 208 within the section 318 to identify a highest intensity pixel 322. As noted above, a variety of methods may be used to generate the fit curve 320. Because of the section 318, the flat regions at the edges, which may be hard to fit to due to their significantly different shape from the rest of the series 314, are omitted, thereby providing a more accurate fit curve 320. It should be appreciated that the highest intensity pixel 322 may correspond to a pixel with the greatest value and/or a value within a threshold amount of adjacent pixels, as noted above. Furthermore, the highest intensity pixel 322 may also correspond to a fractional pixel or a floating point value. In one or more embodiments, at least a portion of one or more columns or one or more rows is removed. For example, one or more pixels along a top edge or a bottom edge may be removed. Additionally, one or more pixels along a left edge or right edge may be removed. Accordingly, entire rows or columns may not be removed from the evaluation, but only certain pixels forming the rows or columns.

Figure 4A:
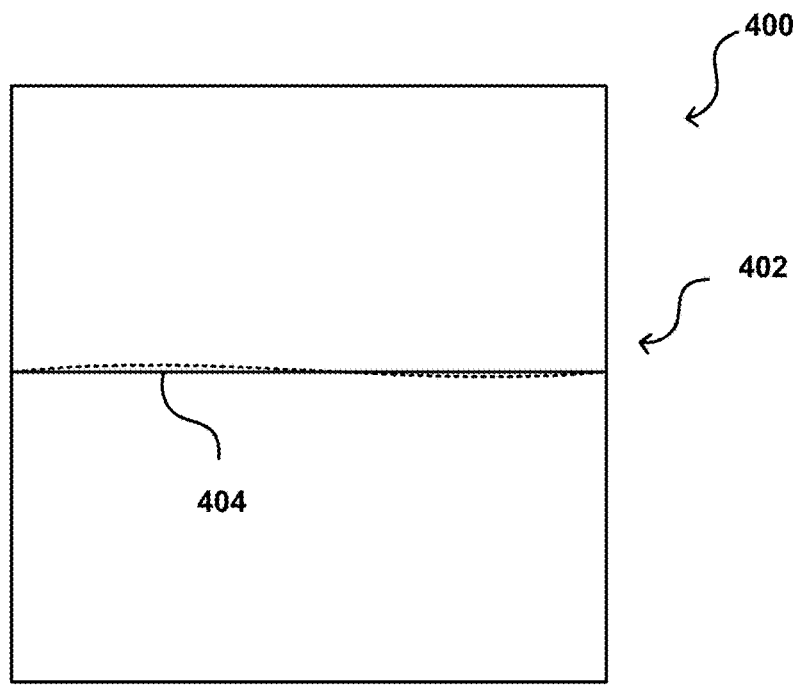
FIGS. 4A and 4B illustrate line fitting over sets of brightest pixel values, according to at least one embodiment.

In at least one embodiment, each of the highest intensity pixels 310, 322 from each of the rows and/or columns may be identified and plotted together. FIG. 4A illustrates a representation 400 of a set 402 of the brightest pixels from all image columns. It should be appreciated that while embodiments may describe using all image columns, various embodiments may sample a subset of image columns within the image. For example, resource consumption may be reduced by evaluating every other column, or every third column, or the like. Additionally, the clipping or sectioning applied above may also be utilized to focus on particular regions of the image to reduce a total number of rows and/or columns analyzed. As depicted, the set 402 extends substantially horizontally across the image. However, as shown, there may be some variation based on the analysis previously performed to identify the brightest pixels. In at least one embodiment, a best fit line 404 is applied to the set 402. As shown, portions of the set 402 may be positioned above or below the best fit line 404. It should be appreciated that the best fit line 404 may be a substantially straight line that may be fit using one or more fitting algorithms. In at least one embodiment, the best fit line 404 may be applied to one or more different sets 402, each computed using a different curve fitting technique, to determine the best fit line 404. By way of example, three different curve fitting techniques may be applied to generate different sets 402 and then three different best fit lines 404 may be generated, one for each of the different sets 402. These different best fit lines 404 may then be compared to identify the best fit line 404 with the highest correlation to the set 402, and the best fit line 404 with the highest correlation may be selected.

Figure 4B:
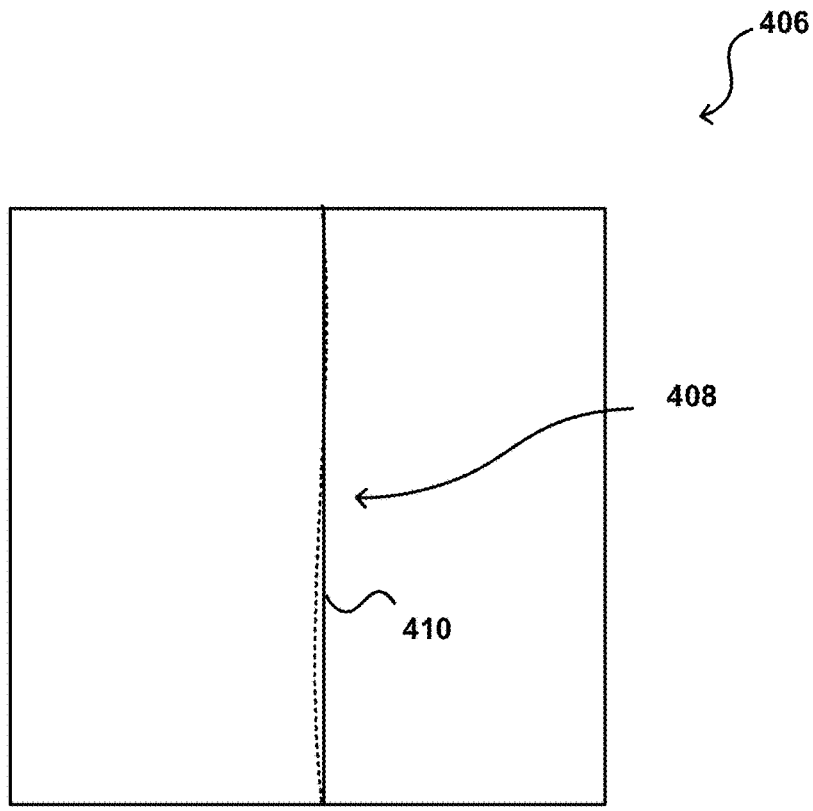

FIG. 4B illustrates a representation 406 of a set 408 of the brightest pixels from all image rows. It should be appreciated that while embodiments may describe using all image rows, that various embodiments may sample a subset of image row within the image. For example, resource consumption may be reduced by evaluating every other row, or every third row, or the like. Additionally, the clipping or sectioning applied above may also be utilized to focus on particular regions of the image to reduce a total number of rows and/or columns analyzed. This is example, the set 408 extends substantially vertically across the image, however, as shown, there may be some variation based on the analysis previously performed to identify the brightest pixels. In at least one embodiment, a best fit line 410 is applied to the set 408. As shown, portions of the set 408 may be positioned left or right of the best fit line 410. It should be appreciated that the best fit line 410 may be a substantially straight line that may be fit using one or more fitting algorithms. As described above, the best fit line 410 may be applied to one or more different sets 408, each computed using a different curve fitting technique, to determine the best fit line 408. By way of example, three different curve fitting techniques may be applied to generate different sets 408 and then three different best fit lines 410 may be generated, one for each of the different sets 408. These different best fit lines 410 may then be compared to identify the best fit line 410 with the highest correlation to the set 408, and the best fit line 410 with the highest correlation may be selected.

It should be appreciated that, in certain embodiments, dirt or dust may appear on the lens, which may distort or otherwise affect the pixel intensity for one or more columns or rows. For example, an outlier pixel may be positioned within the set 408. The outlier pixel may correspond to a pixel having a position that exceeds a threshold distance from other pixels. As an example, an outlier pixel for the set 408 may correspond to a pixel that has an intensity greater than a certain percentage of one or more surrounding pixels. Furthermore, outlier pixels may be determined based at least in part on a distance between pixels within the set 408 and the best fit line 410. In one or more embodiments, a pixel that is a threshold distance away from the best fit line 410 may be considered an outlier pixel. As another example, an outlier pixel may be positioned within the set 402, and embodiments of the present disclosure may determine a distance between pixels within the set 402 and the best fit line 404. If a pixel exceeds a threshold distance from the best fit lines 404, 410, that pixel may be discarded and the best fit lines 404, 410 may be recalculated without the outlier pixel.

Figure 4C:
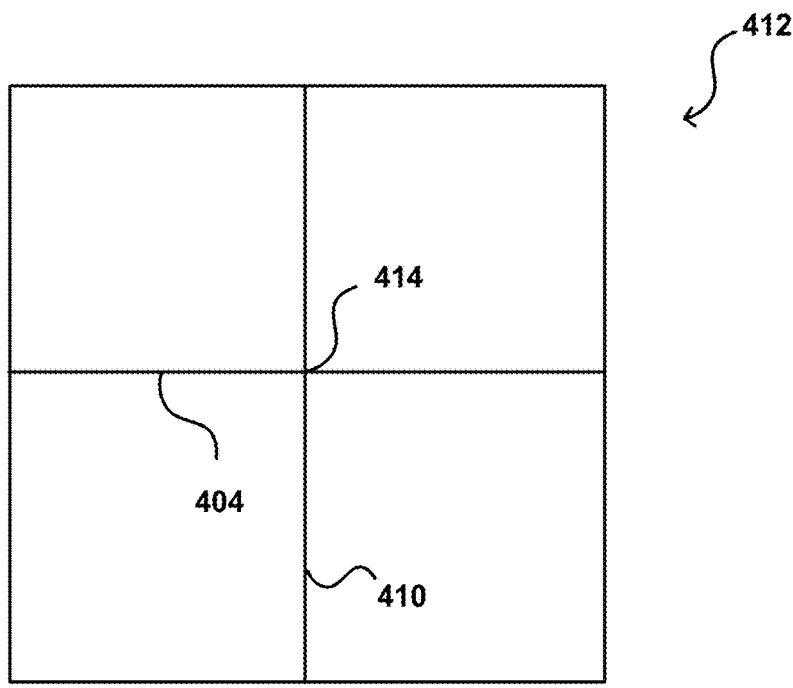
FIGS. 4C and 4D illustrate optical center determination at an intersection between fit lines, according to at least one embodiment.

FIG. 4C illustrates a representation 412 identifying an optical center point 414 at an intersection between the best fit lines 404, 410. The optical center point 414 takes into account the brightest points from each of the rows and columns identified, where an intersection corresponds to a brightest point for both horizontal rows and vertical columns. As noted above, the optical center point 414 may correspond to a pixel location, a fractional pixel, or a floating point value, among other options. Accordingly, the pixel location corresponding to the optical center point 414 may be utilized with calibrations for various imaging devices. As noted above, these devices may be utilized in a variety of different applications, such as vehicles, user device cameras, robotics, video analysis, and the like. Furthermore, calibrations may be used with image signal processing, for example, with dedicated hardware components that may be pre-calibrated prior to providing the hardware to a user. Additionally, in various embodiments, calibration information for a set of hardware components may be provided to users to perform their own calibrations.

Figure 4D:
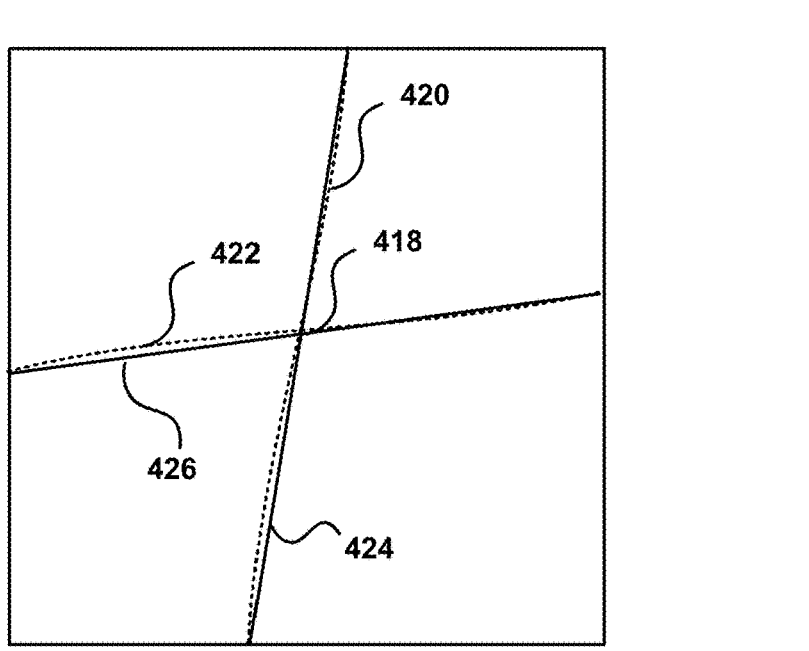

FIG. 4D illustrates a representation 416 identifying an optical center point 418 where the lens utilized to obtain the calibration image is tilted with respect to the sensor plane. As a result, the vignetting may be elliptical, rather than substantially circular. As noted above, the optical center point 418 may correspond to a pixel location, a fractional pixel, or a floating point value, among other options. As illustrated, a set 420 corresponding to the points associated with the rows and a set 422 corresponding to the columns each include a best fit line 424, 426. The intersection of the best fit lines 424, 426, as noted above, corresponds to the optical center point 418. Accordingly, embodiments may be utilized to identify the optical center even when the lens is tilted or otherwise misaligned, thereby providing further improvements over complex algorithms that may require better alignment between components in order to produce reliable results.

Figure 5:
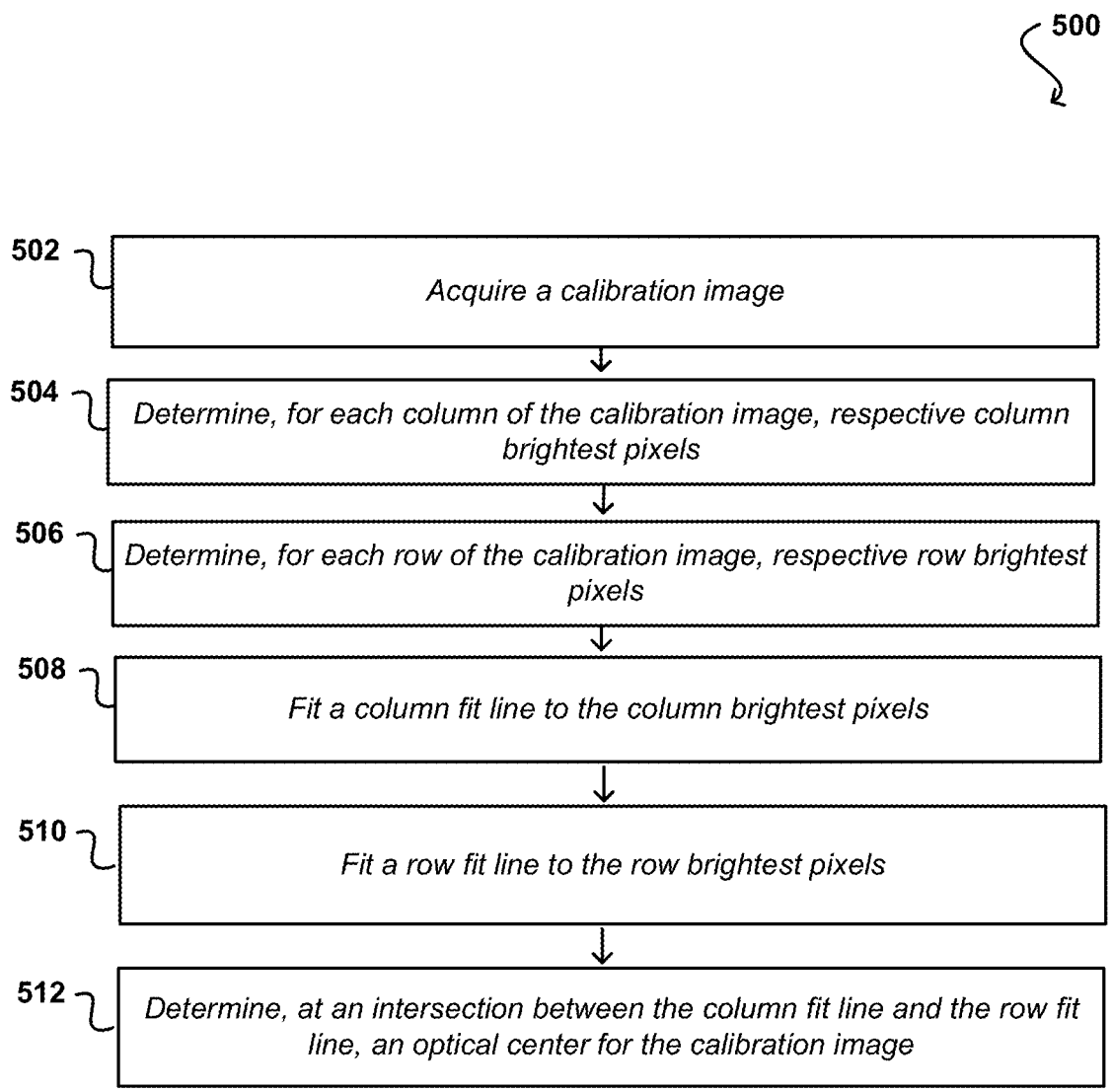
FIG. 5 illustrates an example process for determining optical center for an image, according to at least one embodiment.

FIG. 5 illustrates an example process 500 for determining an optical center for an image. It should be understood that for this and other processes presented herein that there can be additional, fewer, or alternative steps performed in similar or alternative order, or at least partially in parallel, within scope of various embodiments unless otherwise specifically stated. In this example, a calibration image is acquired 502. The calibration image may be a flat field image generated for the purposes of calibrating one or more hardware components corresponding to an imaging device, such as a camera. Brightest pixels for each column of the calibration image are determined 504. As noted above, each column of pixels forming the image may be evaluated to determine the brightest pixel. In at least one embodiment, the brightest pixel is determined by establishing a brightness or intensity value for each pixel, fitting a curve to the values, and then determining a peak of the curve. Brightest pixels are also determined for each row of the calibration image 506. The brightest pixels from the rows and columns may be used to generate respective sets of pixels. A column fit line is fit to the brightest pixels from the columns 508 and a row fit line is fit to the brightest pixels from the rows 510. In various embodiments, the lines are straight or substantially straight lines, but it should be appreciated that various embodiments may also include curved lines. The fit lines are then arranged along the image to determine an intersection 512, which corresponds to an optical center for the image.

Figure 6:
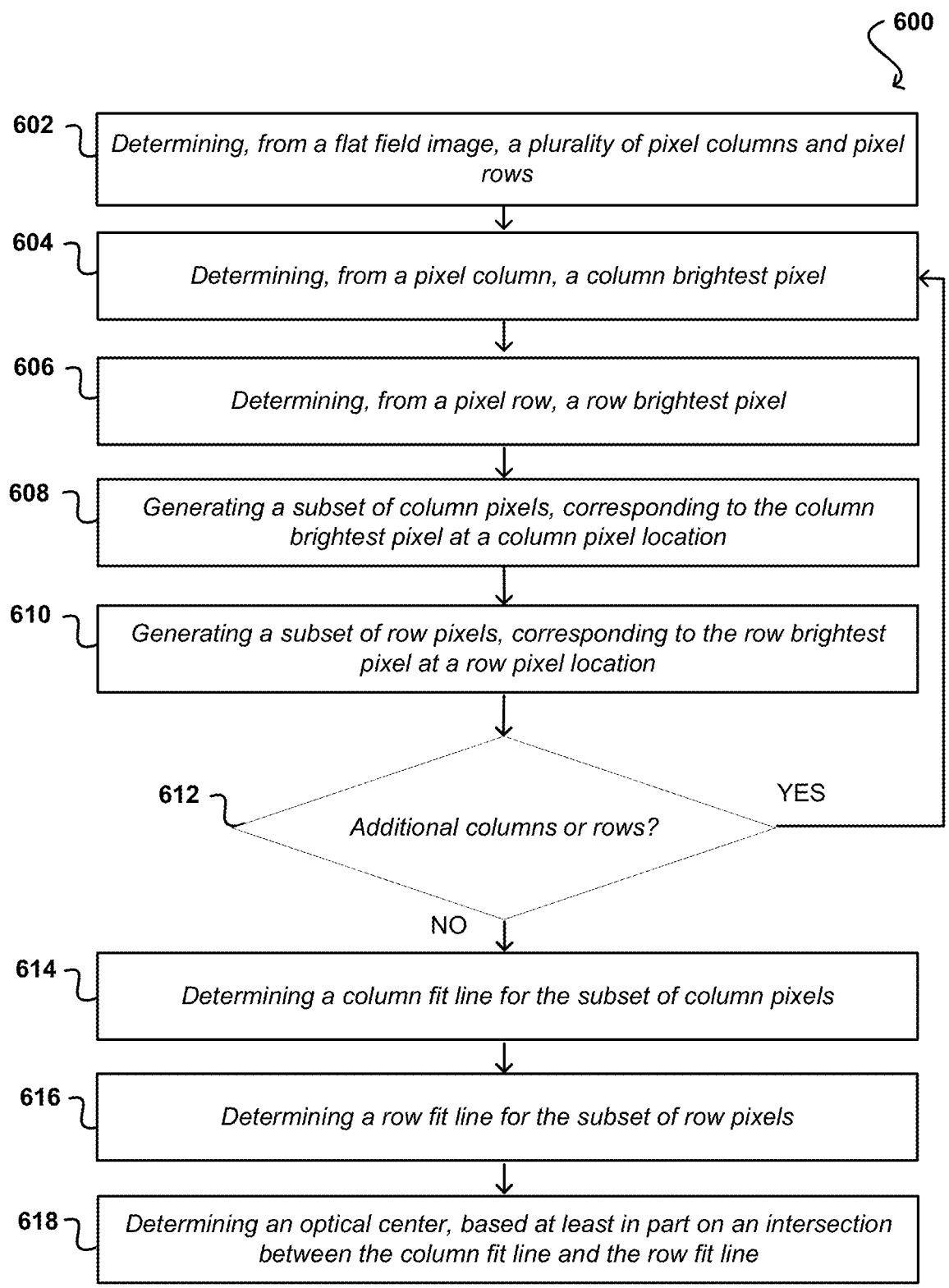
FIG. 6 illustrates an example process for determining optical center for an image, according to at least one embodiment.

FIG. 6 illustrates an example process 600 for determining an optical center in an image. In this example, a plurality of pixel columns and pixel rows are determined 602. For example, an image, such as a flat field image corresponding to a calibration image, may be evaluated to determine rows and columns of pixels forming the image. The respective rows and columns of pixels may then be evaluated. By way of example, a column brightest pixel may be determined from a pixel column of the plurality of columns 604. Additionally, the brightest pixel(s) of a row may be determined from a pixel row(s) of the plurality of rows 606. As described herein, the brightest pixels may be determined by evaluating pixel intensity values for each pixel forming the row and/or column, fitting a curve to the values, and then determining a peak of the curve. A subset of column pixels may be generated 608, where the subset includes the brightest pixel(s) of a column at a respective column pixel location(s). Additionally, a subset of row pixels may also be generated 610, where the subset includes the row brightest pixel at a respective row pixel location.

In at least one embodiment, a determination is made whether there are additional columns and/or pixels to evaluate 612. If there are, the process may repeat until respective brightest column pixels and brightest row pixels are found for each column and/or row of the image. As a result, the respective subsets may include a number of different column brightest pixels at different locations. In at least one embodiment, a column fit line is determined for the subset of column pixels 614. Additionally, a row fit line is determined for a subset of row pixels 616. These fit lines may then be evaluated to determine an optical center for the image 618, where the optical center may correspond to an intersection between the column fit line and the row fit line.

In various embodiments, systems and methods of the present disclosure may be associated with a hardware component that is calibrated prior to use. For example, a hardware component or set of components may be utilized to obtain a calibration image. The optical center of the image may be determined for use as calibration data. The calibration data may then be utilized with various other algorithms or processes associated with the hardware, such as radial lens shading, lens distortion, chromatics, and the like. In this manner, the optical center may be provided as calibration data to correct images obtained using the hardware component.

In certain embodiments, the optical center may be re-established or re-determined over time, for example if one or more features of the hardware component degrade. Accordingly, the process may be repeated with a new or updated calibration image. Thereafter, an image processing pipeline may be provided with the newly determined optical center to update and refine the calibration data.

Data Center

Figure 7:
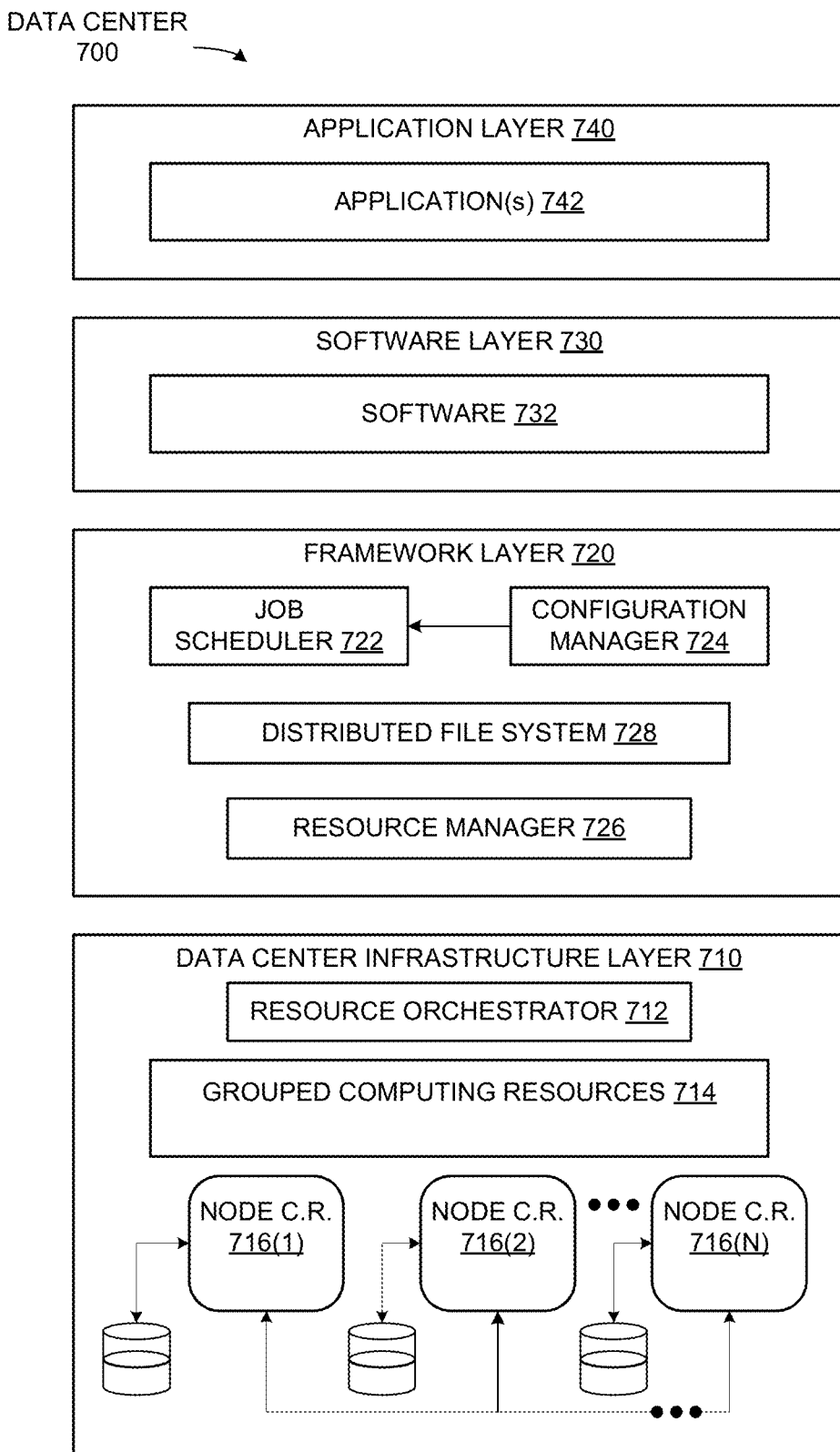
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to determine optical center for a hardware component, such as a camera or imaging device with a lens.

Computer Systems

Figure 8:
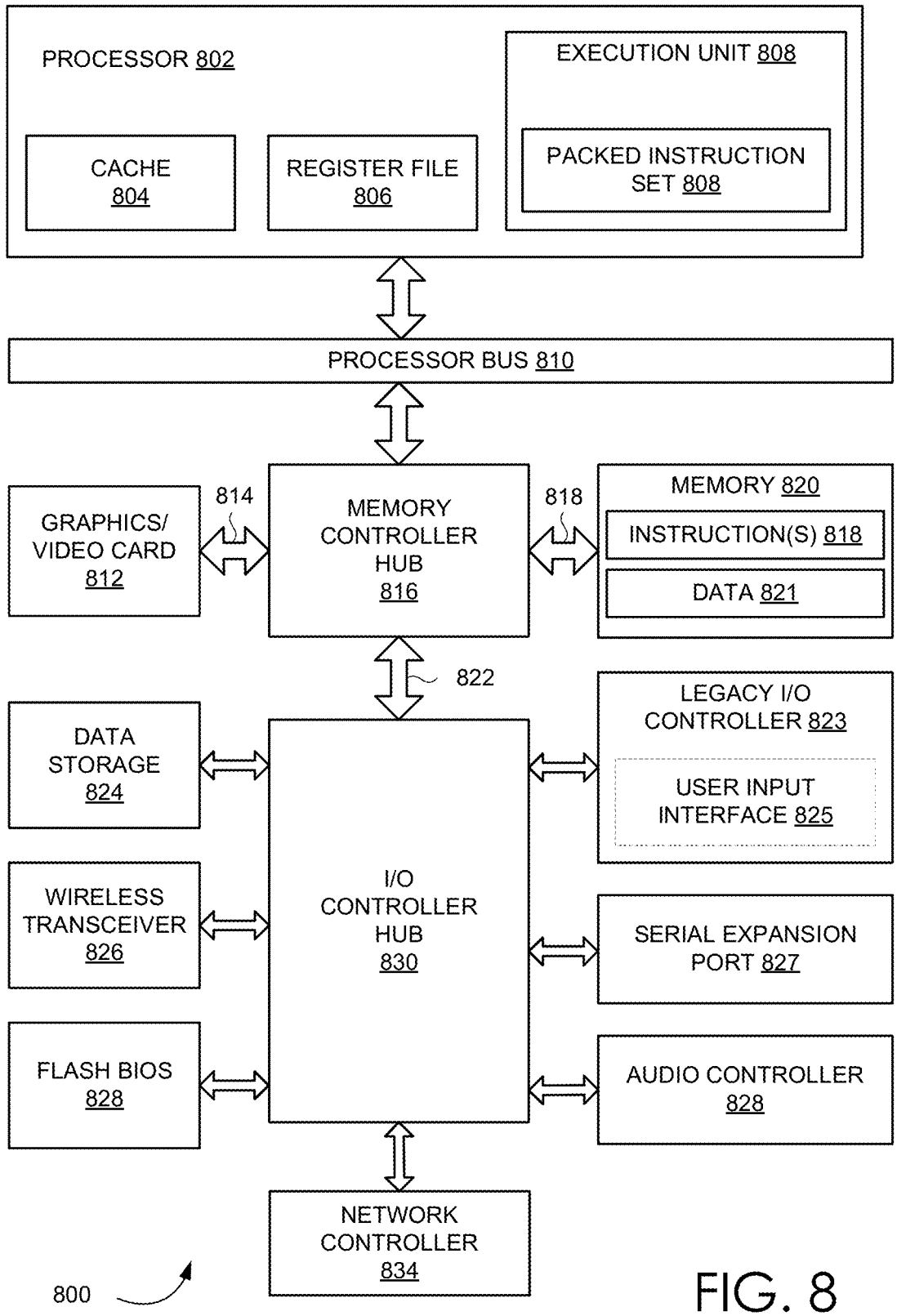
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe)

or some combination thereof. In at least one embodiment, one or more components of computer system 800 are interconnected using compute express link (CXL) interconnects.

Such components can be used to determine optical center for a hardware component, such as a camera or imaging device with a lens.

Figure 9:
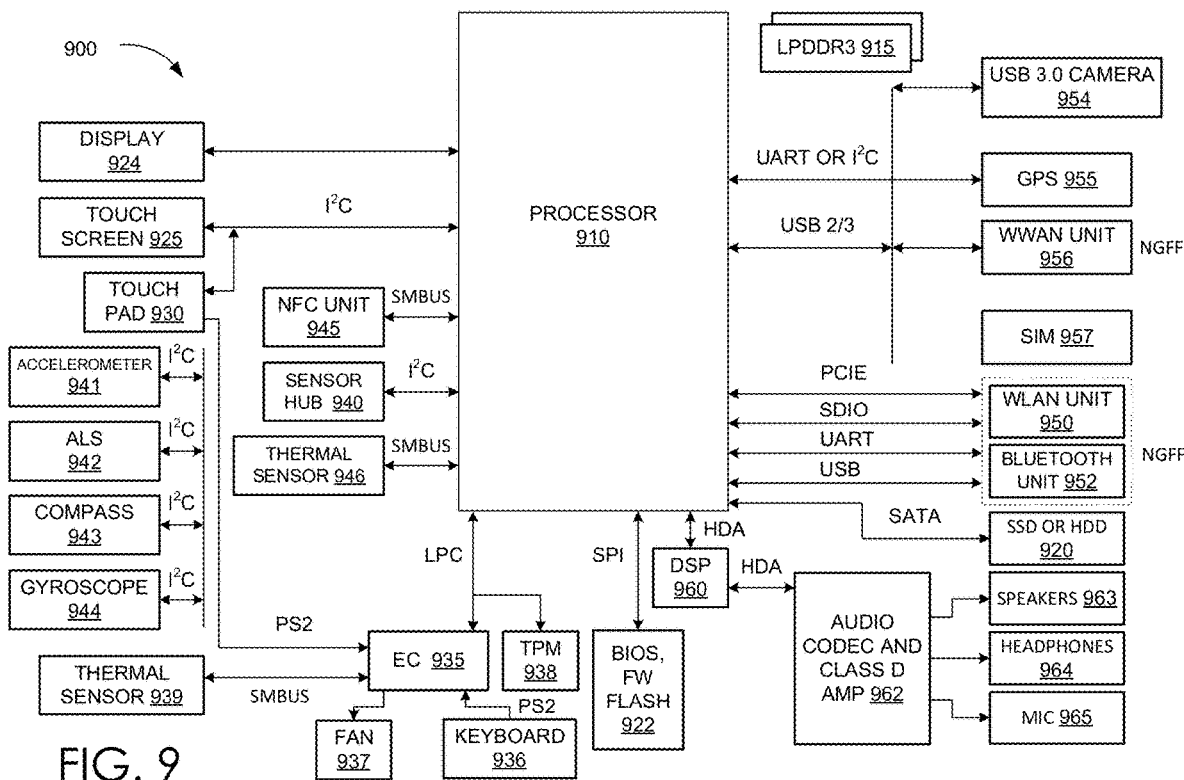
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to determine optical center for a hardware component, such as a camera or imaging device with a lens.

Figure 10:
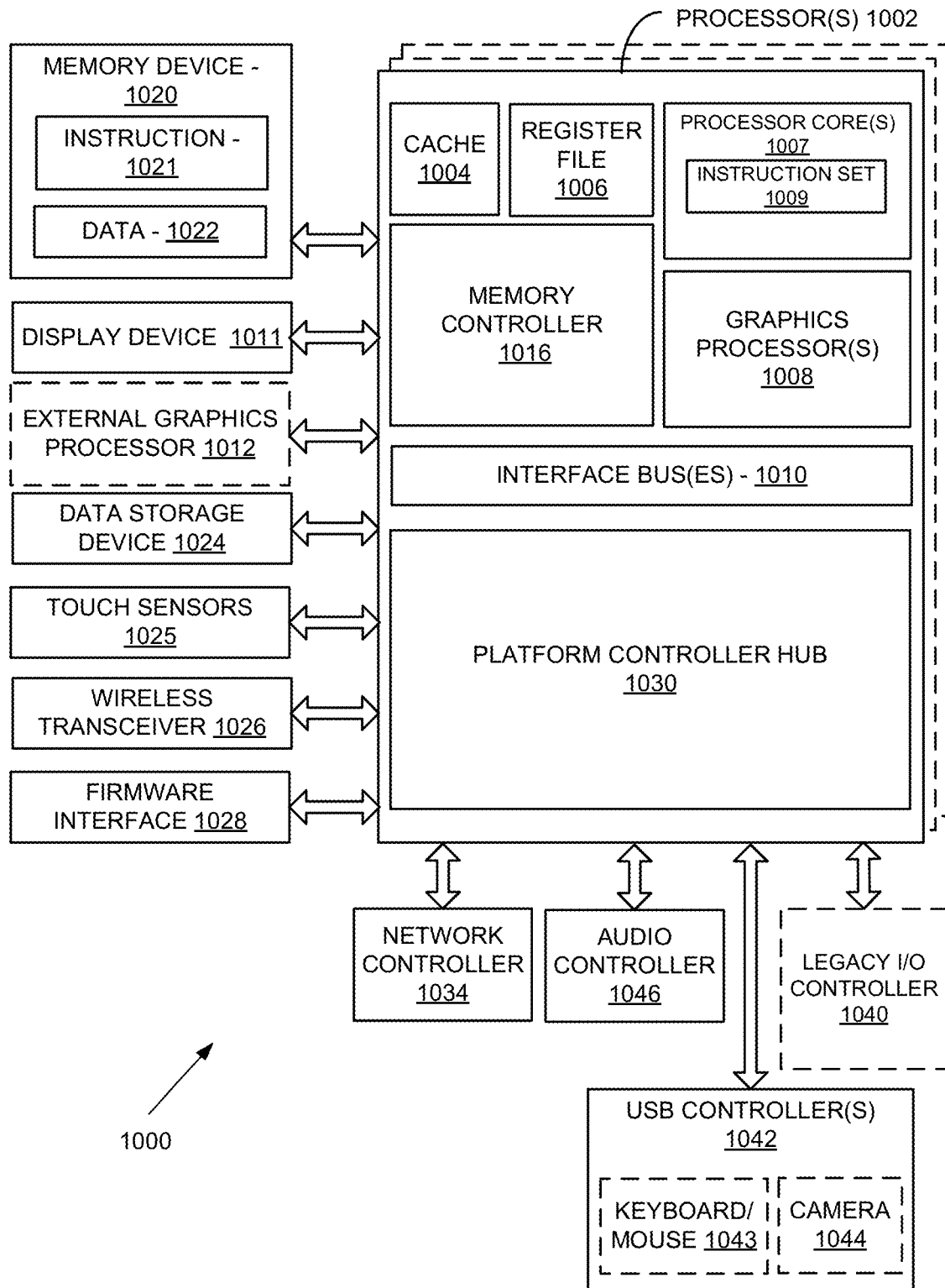
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to determine optical center for a hardware component, such as a camera or imaging device with a lens.

Figure 11:
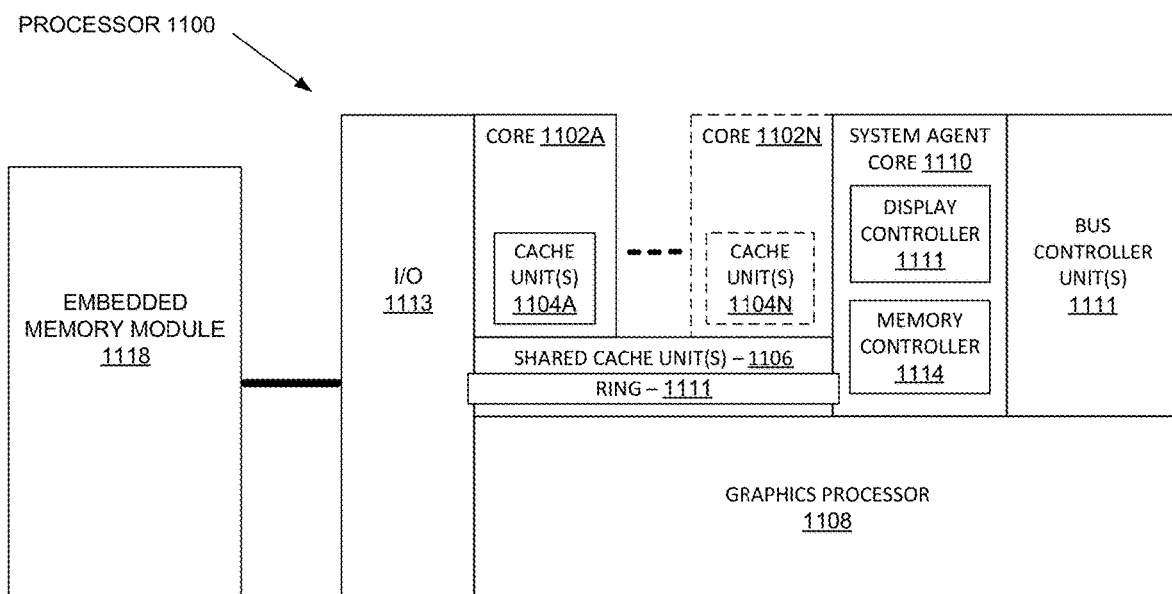
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to determine optical center for a hardware component, such as a camera or imaging device with a lens.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    determining, for each column of a plurality of columns of pixels forming an image, a respective first pixel corresponding to a first brightest pixel;
    determining, for each row of a plurality of rows of pixels forming the image, a respective second pixel corresponding to a second brightest pixel;
    fitting a first fit line to the respective first pixels;
    fitting a second fit line to the respective second pixels;
    identifying an intersection between the first fit line and the second fit line; and
    providing an identifier of the intersection to calibrate an image device used to produce the image.

2. The computer-implemented method of claim 1, wherein the intersection corresponds to an optical center of the image.

3. The computer-implemented method of claim 1, further comprising:
    determining the image device produced the image using a fisheye lens;
    removing at least a portion of one or more columns of the plurality of columns, the portion of the one or more columns corresponding to one or more pixels along at least one of a top edge or a bottom edge of the image; and
    removing at least a portion of one or more rows of the plurality of rows, the portion of the one or more rows corresponding to one or more pixels along at least one of a left edge or a right edge of the image.

4. The computer-implemented method of claim 1, further comprising:
    determining a first fit curve, for each column of the plurality of columns of pixels; and
    identifying a maximum point along the first fit curve, the maximum point corresponding to the respective first pixel for each column.

5. The computer-implemented method of claim 1,
    determining a second fit curve, for each row of the plurality of rows of pixels; and
    identifying a maximum point along the second fit curve, the maximum point corresponding to the respective second pixel for each row.

6. The computer-implemented method of claim 5, wherein the second fit curve is at least one of a moving average, a quartic polynomial, a cubic polynomial, or a quadratic polynomial.

7. The computer-implemented method of claim 1, further comprising:
    determining a distance between an outlier pixel and the first fit line;
    determining the distance exceeds a threshold;
    generating a subset of the respective first pixels, the subset omitting the outlier pixel; and
    fitting a revised first fit line to the subset of the respective first pixels.

8. The computer-implemented method of claim 7, further comprising:
    identifying the intersection between the revised first fit line and the second fit line.

9. A system, comprising:
    at least one processor; and
    memory storing instructions that, when executed, cause the system to:
        access a flat field image;
        determine a first line representative of brightest pixels for a plurality of columns of pixels forming the flat field image;
        determine a second line representative of brightest pixels for a plurality of rows of pixels forming the flat field image; and
        determine an intersection between the first line and the second line, the intersection corresponding to an optical center of the flat field image.

10. The system of claim 9, wherein the instructions when executed further cause the system to:
    generate at least a portion of a calibration file, the calibration file including location information for the optical center of the flat field image.

11. The system of claim 9, wherein the instructions when executed further cause the system to:
    omit at least a portion of one or more columns of the plurality of columns, the portion of the one or more columns corresponding to one or more pixels along at least one of a top edge or a bottom edge of the flat field image; and
    omit at least a portion of one or more rows of the plurality of rows, the portion of the one or more rows corresponding to one or more pixels along at least one of a left edge or a right edge of the flat field image.

12. The system of claim 9, wherein the plurality of columns correspond to each column of pixels forming the flat field image and the plurality of rows correspond to each row of pixels forming the flat field image.

13. The system of claim 9, wherein the instructions when executed further cause the system to:
    determine, for each column of the plurality of columns, a respective column fit curve;
    determine, for each respective column fit curve, a respective brightest column pixel;
    extract each respective brightest column pixel; and
    generate a series of column pixels from the extracted brightest column pixels.

14. The system of claim 9, wherein the instructions when executed further cause the system to:
    determine, for each row of the plurality of row, a respective row fit curve;
    determine, for each respective row fit curve, a respective brightest row pixel;
    extract each respective brightest row pixel; and
    generate a series of row pixels from the extracted brightest row pixels.

15. The system of claim 9, wherein the optical center is at least one of a pixel location, a fractional pixel, or a floating point value.

16. A computer-implemented method, comprising:
    generating, from a flat field image, respective column fit curves for a plurality of columns;
    determining, from the respective column fit curves, a plurality of first pixels for each column of the plurality of columns;
    generating, from the flat field image, respective row fit curves for a plurality of rows;
    determining, from the respective row fit curves, a plurality of second pixels for each row of the plurality of rows;
    fitting a first line to the plurality of first pixels;
    fitting a second line to the plurality of second pixels; and
    determining an optical center of the flat field image, based at least in part on the first line and the second line.

17. The computer-implemented method of claim 16, wherein the optical center corresponds to an intersection between the first line and the second line.

18. The computer-implemented method of claim 16, further comprising:
    determining a distance between an outlier pixel and the first line;
    determining the distance exceeds a threshold;
    removing the outlier pixel from the plurality of first pixels to form a second plurality of first pixels; and
    refitting the first line to the second plurality of first pixels.

19. The computer-implemented method of claim 16, wherein at least one of the row fit curves or the column fit curves are at least one of a moving average, a quartic polynomial, a cubic polynomial, or a quadratic polynomial.

20. The computer-implemented method of claim 19, further comprising:
    determining location information for the optical center; and
    generating at least a portion of a calibration file, the calibration file including the location information.

* * * * *